United States Patent
Al-Kassar et al.

(10) Patent No.: US 12,443,723 B2
(45) Date of Patent: Oct. 14, 2025

(54) COLLABORATIVE SOFTWARE APPLICATION STATIC VULNERABILITY DETECTION

(71) Applicant: SAP SE, Walldorf (DE)

(72) Inventors: Feras Al-Kassar, Antibes (FR); Luca Compagna, La Roquette-sur-Siagne (FR); Davide Balzarotti, Antibes (FR)

(73) Assignee: SAP SE, Walldorf (DE)

( * ) Notice: Subject to any disclaimer, the term of this patent is extended or adjusted under 35 U.S.C. 154(b) by 339 days.

(21) Appl. No.: 18/321,627

(22) Filed: May 22, 2023

(65) Prior Publication Data

US 2024/0394375 A1    Nov. 28, 2024

(51) Int. Cl.
G06F 21/62    (2013.01)
G06F 21/54    (2013.01)
G06F 21/57    (2013.01)

(52) U.S. Cl.
CPC ............ G06F 21/577 (2013.01); G06F 21/54 (2013.01); *G06F 2221/033* (2013.01)

(58) Field of Classification Search
CPC ... G06F 21/577; G06F 21/54; G06F 2221/033
See application file for complete search history.

(56) References Cited

U.S. PATENT DOCUMENTS

| 5,832,271 A | * | 11/1998 | Devanbu | G06F 11/3612 |
| | | | | 714/1 |
| 2009/0259989 A1 | * | 10/2009 | Cifuentes | G06F 11/3604 |
| | | | | 717/110 |
| 2012/0304153 A1 | * | 11/2012 | Li | G06F 8/75 |
| | | | | 717/123 |

* cited by examiner

*Primary Examiner* — Farid Homayounmehr
*Assistant Examiner* — Judy Bazna
(74) *Attorney, Agent, or Firm* — Fountainhead Law Group, PC

(57) ABSTRACT

Techniques for collaborative detection of software application static vulnerabilities are disclosed. Print statements are injected into the source code for a software application for each of its inputs and outputs. Vulnerability findings are obtained from two or more static analysis tools run against the modified source code. A determination is made that a first static analysis tool reports that tainted data can flow from an input of a function to a return value of the function and it is determined that the second static analysis tool reports that tainted data can flow into the input of the function and that tainted data cannot flow to the return value based on the vulnerability findings. The injection-modified source code is modified to include an assignment of the input to the output to obtain stitch-modified source code. Then vulnerability findings are obtained for the stitch-modified source code and they include new findings.

20 Claims, 5 Drawing Sheets

COLLABORATIVE SOFTWARE APPLICATION STATIC VULNERABILITY DETECTION

BACKGROUND

The present disclosure pertains to software security testing and in particular to software application static vulnerability detection.

A common method used by software developers to identify injection vulnerabilities in Web applications is through Source Code Scanning Tools. However, the accuracy of static analysis tools (also called Static Application Security Testing tools, or SAST, in the industry) is limited. For instance, certain commercial SAST tools struggle to cope with the complexity of real world applications. The failure of SAST tools can be a result of code snippets whose presence prevented SAST tools from inferring the data-flow link between two elements of the program. In other words, each pattern captured a limitation of one of the existing tools. Such code snippets may be referred to as "testability tarpits." Unfortunately, such tarpits affect different tools in different ways: what poses a problem from one tool may be analyzed correctly by another and vice versa. And such tarpits are prevalent in today's applications.

These limitations are known by software security testing practitioners, who try to mitigate the risk of false negatives by analyzing their application with multiple static analysis tools in the hope that what a product misses, another can find. Unfortunately, combining the alarms of different tools can reduce the risk of false negatives only to a certain extent. In fact, any sufficiently complex application would contain enough different testability tarpits to impede the analysis of all SAST tools. Thus, even if for different reasons, it is likely that each tool would encounter a snippet of code it cannot handle correctly.

The present disclosure addresses these issue and others, as further described below.

DETAILED DESCRIPTION

Figure 1:
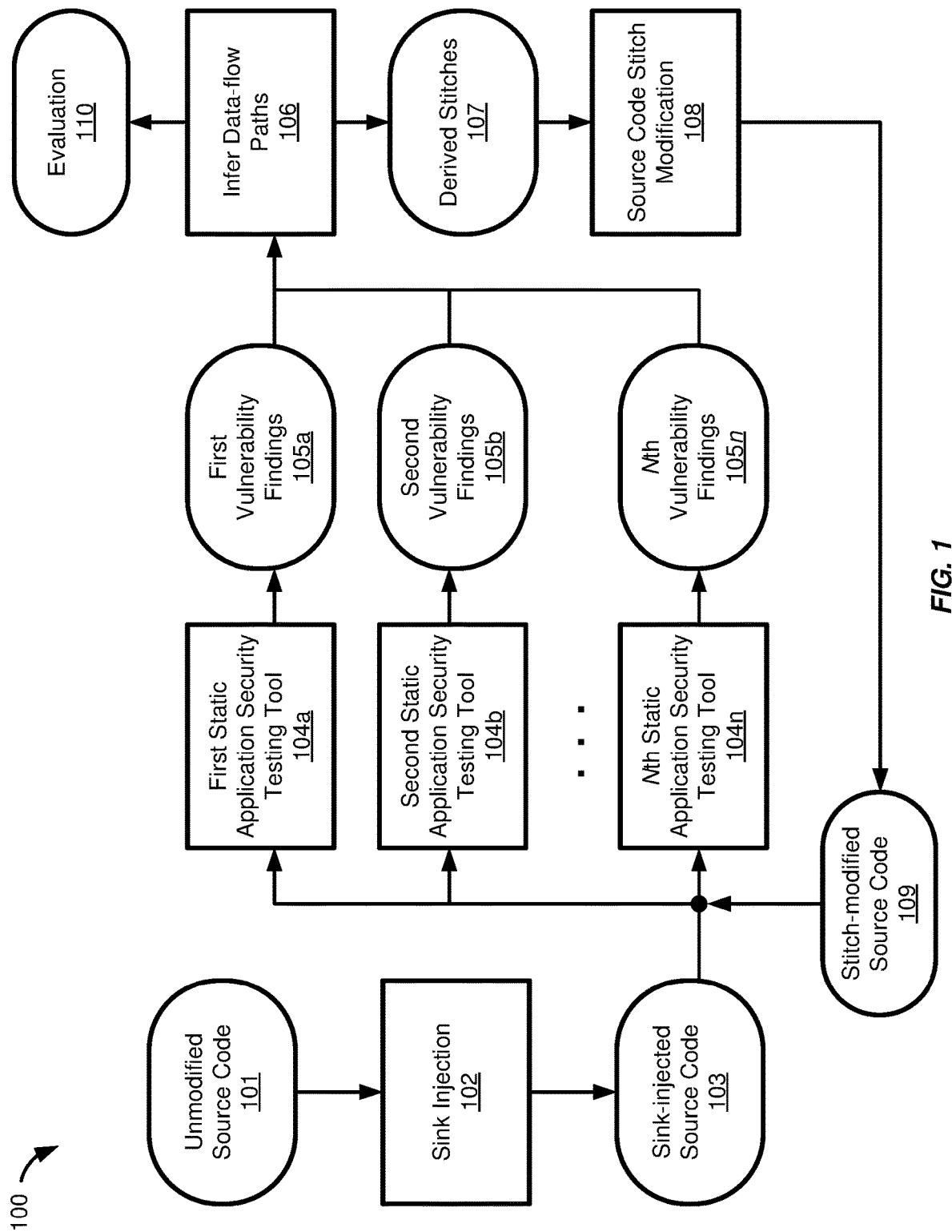
FIG. 1 shows a diagram of a collaborative software application static vulnerability detection technique, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second." "third." "fourth," etc., do not necessarily indicate an ordering or sequence unless indicated. These terms, as used herein, may simply be used for differentiation between different objects or elements.

As mentioned above, static application security testing (SAST) tools each have limitations and software security testing practitioners try to mitigate the risk of false negatives by analyzing their application with multiple SAST tools in the hope that what a product misses, another can find. Unfortunately, combining the alarms of different tools can reduce the risk of false negatives only to a certain extent. In fact, any sufficiently complex application would contain enough different testability tarpits to impede the analysis of all SAST tools. Thus, even if for different reasons, it is likely that each tool would encounter a snippet of code it cannot handle correctly.

To address these issues and others, the present disclosure provides techniques for collaborative software application static vulnerability detection. These techniques enable the collaboration between different SAST tools. The technique operates on application source code, thus allowing our approach to be applied to SAST tools without the need to access their internal data structures. As an overview, the techniques search for signs of interrupted data flows by using the tools as "oracles" and then inject another path to circumvent the piece of code that tools were not able to handle correctly.

The collaborative software application static vulnerability detection technique is described in further detail below. However, prior to that, an overview of software security testing is provided. One category of software testing tools are "static" tools, which scan applications without the need of deploying the project, by analyzing their code for signs of security issues. Different models can be used to represent both the syntax and the semantics of source code. One such model is a "code property graph," which merges in a single model the abstract syntax tree with three other three graph-based representations: the control flow graph to represent the order of execution of the statements, the program dependency graph to capture the dependency between two statements by following the data-flow among them, and the call graph to represent functions and methods invocations.

These graph-like representations of the program are suited to detect one of the most prevalent classes of vulnerabilities, called injection vulnerabilities. Injection vulnerabilities occur when an attacker can inject harmful values into an application that lead to unexpected results when interpreted by other parts of the system. For example, directly including a value coming for the attacker in an HTML page can lead to an XSS vulnerability if the value can include a HTML tag. This tag causes the user browser to execute attack-provided code, which can lead to harmful actions like stealing the user's cookies. Many other kind of injections exist. For instance, command injection allows an attacker to run a command in the system. This could lead the attacker to get full control of the system.

Developers need to be particularly careful about injection vulnerabilities and sanitize all the inputs that could be controlled by an attacker before these inputs reach a dangerous operation. To detect these bugs, static tools need to determine the flow of user-provided information through the program, starting from the points where attackers can inject their input (called "sources") until the points in the program where this input is consumed and interpreted (called "sinks"). The variables which carry the values between sources and sinks are called "tainted variables." In this setting, detecting injections boils down to discovering data-flow paths between a source and a sink, for which no sanitizers have been used.

However, this process presents two main challenges. First, the static analysis tool needs to be able to construct the path in the first place, by understanding how data can propagate among different variables and different parts of the code (a process normally called taint propagation). Second, the tool needs to correctly analyze the resulting path to detect whether the user-provided input is properly sanitized to protect against the specific type of injection vulnerability that was being considered. Errors in these two steps can cause the tool to miss vulnerabilities, but also to raise false alarms, in which case the application is erroneously flagged as vulnerable when in reality it is not.

One of the reason behind these errors are "testability tarpits," that is, specific code patterns that can prevent a static tool to properly analyze its code (and therefore build a correct internal model). Even the best SAST tools are impacted by these tarpits and cannot always fully analyze real-world applications.

Finally, even if the internal graph representation of an application is built correctly, it is often large and time-consuming to explore exhaustively. Thus, certain static analysis tools often employ several thresholds to limit their analysis and produce results in a reasonable time. Certain tools limit the depth of the call graph, the depth of the data flow, and the depth of the control flow they process when looking for vulnerabilities. In addition, tools also adopt other thresholds, to discard files over a given size or to kill analyses that take longer than a predefined amount of time. The number, type, and values of the thresholds vary from one tool to another (for instance, some tools prefer to go deeper in the call flow while others prefer to go deeper in the data flow) and they are often not under the control of the analyst.

The techniques for collaborative software application static vulnerability detection further described below can bypass testability tarpits, thereby allowing SAST tools to continue their analysis and report vulnerabilities instead of being limited, by their own internal thresholds or otherwise.

FIG. 1 shows a diagram 100 of a collaborative software application static vulnerability detection technique, according to an embodiment. This technique may be implemented by a computer system, such as a server computer or a system including a plurality of server computers such as a cloud platform, for example. This collaborative vulnerability detection technique uses two or more static application security testing (SAST) tools 104 to detect vulnerabilities in software source code, which originates as unmodified source code 101.

The SAST tools 104 include a first static application testing tool 104a, a second static application testing tool 104b. More than two SAST tools can be used as shown in FIG. 1, up to an Nth static application testing tool 104n. In general, SAST tools 104 identify vulnerabilities by detecting a path between a source and a sink. Thus, detecting vulnerabilities requires a complete data flow graph, without any missing edge. However, as mentioned above, specific patterns of code (called "testability tarpits") may prevent certain tools from detecting the data-flow that connects the source to the sink. Examples of such testability tarpits are described below with respect to FIGS. 3 and 4.

The collaborative software application static vulnerability detection technique shares information about the internal models of two or more SAST tools 104 without accessing their code or data structures. The SAST tools 104 are considered as a "black box" which receives as input an application and returns a set of alerts indicating potential vulnerabilities.

The collaborative vulnerability technique operates on the source code 101 of the target application, by using an approach based on two main operations: infer 106 and stitch 108. The infer operation uses one SAST tool 104 to identify new security-relevant data-flow paths (i.e., those that originate from a source that can contain user-controlled input values) for another SAST tool 104. To achieve this, sink injection 102 is first performed to inject "fake" sink instructions (e.g., "echo" operations) into the unmodified source code 101 of target application to obtain sink-injected source code 103.

In some embodiments the unmodified source code 101 is also provided to each SAST tool 104 and the findings from the unmodified source code 101 may be compared to the findings from stitch-modified source code 109.

Then, each SAST tool 104 is run on the sink-injected source code 103, scanning that modified application to generate corresponding vulnerability findings 105. That is, each SAST tool 103 outputs its own vulnerability findings 105. For example, the First Static Application Security Testing Tool 104a outputs First Vulnerability Findings 105a, the Second Static Application Security Testing Tool 104b outputs Second Vulnerability Findings 105a, and the Nth Static Application Security Testing Tool 104n outputs Nth Vulnerability Findings 105n.

After the vulnerability findings 105 are generated, the Infer Data-flow Paths component 106 processes all the reported findings related to the fake sinks injected by Sink Injection 102. The Infer Data-Paths component 106 extracts security relevant data-flow paths from the SAST tools 104. The data-flow paths are those that originate from a source that can contain user-controlled input values. The Infer Data-Paths component uses fake sinks and the SAST tools 104 as "oracles" such that if one tool reports a vulnerability for a fake sink, that indicates that there is a data-flow. If the path between a source and the fake sink is reported as vulnerable by the first SAST tool 104a, for example, it means that the SAST tool 104a was able to build an uninterrupted data-flow path between the two statements. If the same path is not reported as vulnerable by the second SAST tool 104*b*, then then it is likely that its code contained testability tarpits that prevented the second SAST tool 104*b* to reconstruct the same data-flow.

A "stitch" can be created to stitch two ends of a data-flow together such that the new edge can help another tool. This fake assignment by the stitch can propagate the data-flow.

Specifically, the data-path learned by the first SAST tool 104*a* can be used by the Infer Data-flow Paths component 106 to derive a "stitch" 107 that stitches the two ends of the data-flow together, by creating a new edge in the data-flow graph that can help the second SAST tool 104*b* to conduct its analysis. The source code is further modified by the Source Code Stitch Modification component 108 to include this stitch, resulting in Stitch-modified Source Code 109.

After the Infer Data-flow Paths component 106 has iteratively derived stitches for new data-paths, evaluation 110 can be performed. The evaluation component 110 may clean the application code of fake sinks and scan the code with all SAST tools 104 in order to compare the findings with stitches to the original findings.

In summary, a set of SAST tools 104 are used as oracles to infer which variables are connected to a given source without being sanitized. If a tool detects these connections, new data-flow edges are added to the application source code (e.g., with simple variable assignments) to help other tools discover the same connections.

Further details of the Collaborative Software Application Static Vulnerability Detection are presented in Algorithm 1 given in Listing 1 below. Algorithm 1 takes as input a web application and a set of SAST tools, and outputs new findings from SAST tools (if any is reported upon the addition of our stitches).

| Algorithm 1 |
| --- |
| 1:     Input |
| 2:         A   web application |
| 3:         Ts   set of SAST tools |
| 4:     Output |
| 5:         Ns   new findings from SAST tools |
| 6:     Prepare |
| 7:         i←0 |
| 8:         $ST^i \leftarrow \emptyset$ |
| 9:         $Fs^i \leftarrow scan(Ts,A)$ |
| 10:    InferStitch |
| 11:        $A^i \leftarrow inject(A)$ |
| 12:        repeat |
| 13:            i←i+1 |
| 14:            $Fs^i \leftarrow scan(Ts,A^{i-1})$ |
| 15:            $ST^i \leftarrow infer(A^{i-1},Fs^i)$ |
| 16:            $A^i \leftarrow stitch(ST^i,A^{i-1})$ |
| 17:        until $ST^i \equiv \emptyset$ |
| 18:    Evaluate |
| 19:        $A^i \leftarrow clean(A^{i-1})$ |
| 20:        $Fs^{i+1} \leftarrow scan(Ts,A^i)$ |
| 21:        $Ns^i \leftarrow diff(Fs^{i+1},Fs^0)$ |
| Listing 1 |

In the prepare phase (lines 6-9 of Algorithm I), initialize two variables (i.e., the iteration step i is set to 0, the initial set of stitches $ST^0$ is set to the empty set) and run the SAST tools against the original application to collect the set of findings $Fs^0$. These findings can serve as a baseline to evaluate the effectiveness of the techniques in detecting novel findings.

In this Infer and Stitch phase (lines 10-17 of Algorithm I), a set of SAST tools is used to infer whether tainted values propagate between the input and the output of functions. To achieve this, the application source code is modified by "injecting" (line 11) fake sinks after each function call, to print both the inputs and the output values. Since printing a variable can lead to an XSS vulnerability, a SAST tools may raise an alert if the variable is tainted (i.e., it can contain unsanitized user input).

For instance, one embodiment may modify the call to func1, by adding two fake sinks, such as "echo $in;" and "echo $out;" to echo an input variable $in and an output variable $out of a function. An example of fake sinks is given below with respect to FIG. 3.

Then the infer and stitch operations are iterated over (repeat-until loop). Once the iteration step is increased (line 13), the SAST tools are run against the modified application (line 14) and the infer operation (line 15) is then used to process the SAST findings. In particular, the SAST findings related to the injected fake sinks are inspected and the following conditions evaluated:

Condition 1: at least one SAST tool (e.g., 104*a*) detects that tainted data can flow from one function parameter (say $in) to the return value of the function (say $out); and Condition 2: another SAST tool (e.g., 104*b*) reports that tainted data can only flow into $in, but not into $out.

When both Condition 1 and Condition 2 are true, then the findings of the first tool (104*a*) can be used to help the second tool (104*b*). The infer operation derives a new "stitch" that enforces a trivial data-flow connection between $in and $out. The inferred stitches are concretized in our as a modification at the source code of the application. In some embodiments this may be an assignment or a conditional assignment for each stitch. This is done by the stitch operation at line 16 of our algorithm. For instance, for the stitch ST1 capturing the data-flow connection between $in and $out, the conditional assignment hereafter may be added just after the function:

```
// ...
$out = func($in);
/* STITCH_BEGIN: ST1 */
if(round(rand(0,1))){
    $out = $in;
}
/* STITCH_END */
// ...
```

The assignment is wrapped inside an "if" statement to create an alternative edge in the data-flow, without completely replacing the path through the function. This prevents the transformation from introducing new false negatives. The condition for the "if" statement is an expression that is randomly computed as true or false at runtime (e.g., the rand (0,1) expression).

In the general case in which a function has more than one parameter, they are all individually tested and, if more than one argument is part of taint propagation, multiple edges (stitches) will be introduced in separate conditional blocks-like in the following example:

```
// ...
$out = func($in1,$in2);
/* STITCH_BEGIN: ST1 */
if(round(rand(0,1))){
    $out = $in1;
```

```
        }
        /* STITCH_END */
        /* STITCH_BEGIN: ST2 */
        else if(round(rand(0,1))){
            $out = $in2;
        }
        /* STITCH_END */
        // ...
```

Note that while adding stitches, the fake sinks of the input parameters that were used to infer these stitches are removed, as they are not needed anymore. If the fake sinks of all the input parameters of a function are removed, then also the fake sink of the function return variable is removed.

In summary, with the stitch operation, the application is modified to add new instructions that explicitly connect two variables, when at least one tool detects that tainted data can flow from one to the other.

It shall be noted that one iteration of the infer and stitch operations may not be sufficient to discover vulnerabilities. The interplay between different tarpits and their effect on different tools may result in the fact that none are able to process the entire chain during the first iteration. Therefore, the infer and stitch operations may be repeated in an iterative fashion until no new edges (e.g., new stitches) are discovered in the graph.

In this evaluate phase (lines 18-21 of Algorithm I), the application code is cleaned from any remaining fake sinks (clean instruction at line 19) and then the code is scanned with all SAST tools. By removing from these SAST findings those already reported on the original application (diff at line 21), novel SAST findings which emerging because of the stitches added in the previous phase can be output. In order to remove already reported SAST findings, the diff instruction compares findings as follows. Two findings F1 and F2 are considered identical if and only if the following conditions hold:

Finding Condition 1: F1 and F2 belong to the same vulnerability type3; and

Finding Condition 2: the sink line of F1 is identical to the sink line of F2.

An example of evaluation is described below with respect to FIG. 3.

Figure 2:
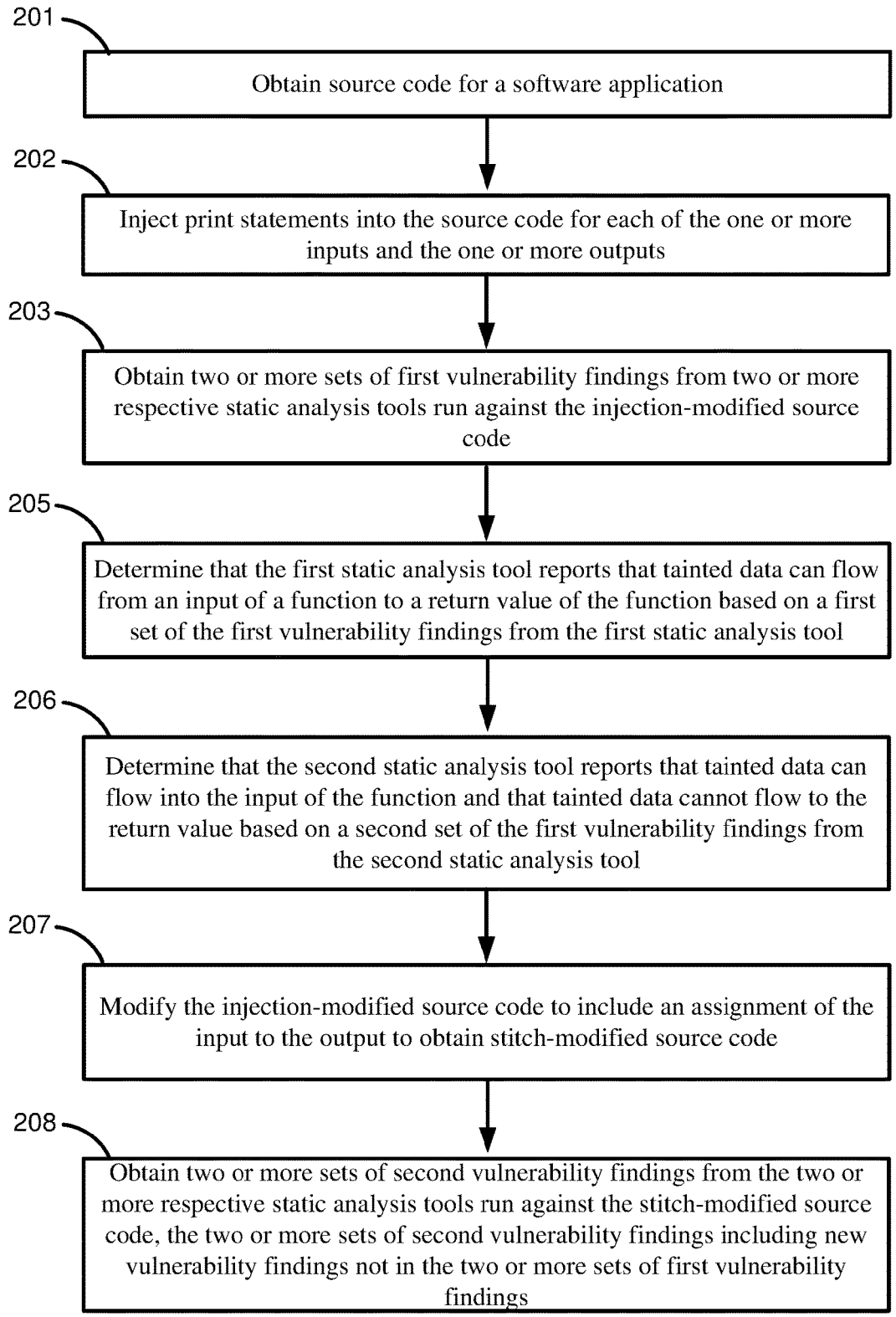
FIG. 2 shows a diagram of a method for collaborative software application static vulnerability detection, according to an embodiment.

FIG. 2 shows a diagram 200 of a method for collaborative software application static vulnerability detection, according to an embodiment.

At 201, the method obtains source code for a software application, the source code including a plurality of functions having one or more inputs and one or more outputs.

At 202, the method injects print statements into the source code for each of the one or more inputs and the one or more outputs to obtain injection-modified source code.

At 203, the method obtains two or more sets of first vulnerability findings from two or more respective static analysis tools run against the injection-modified source code, the static analysis tools including a first static analysis tool and a second static analysis tool;

At 204, the method determines that the first static analysis tool reports that tainted data can flow from an input of a function to a return value of the function based on a first set of the first vulnerability findings from the first static analysis tool;

At 205, the method determines that the second static analysis tool reports that tainted data can flow into the input of the function and that tainted data cannot flow to the return value based on a second set of the first vulnerability findings from the second static analysis tool;

At 206, the method modifies the injection-modified source code to include an assignment of the input to the output to obtain stitch-modified source code; and At 207, the method obtains two or more sets of second vulnerability findings from the two or more respective static analysis tools run against the stitch-modified source code, the two or more sets of second vulnerability findings including new vulnerability findings not in the two or more sets of first vulnerability findings.

In some embodiments, at 208, the method further obtains two or more sets of original vulnerability findings from the two or more respective static analysis tools run against the source code prior to modification and compares the two or more sets of second vulnerability findings to the two or more sets of original vulnerability findings to identify a set of new findings.

In some embodiments, the assignment of the input to the output is conditional on a random value generator.

In some embodiments, the assignment of the input to the output is positioned in the injection-modified source code after the function.

In some embodiments, the method further removes corresponding print statements when modifying the injection-modified source code to include an assignment of the input to the output.

In some embodiments, the method further removes print statements correspond to an output when all print statements for corresponding inputs are removed.

In some embodiments, the source code is in a PHP Hypertext Preprocessor language and the print statements are echo operations.

Examples

The Listing below shows a snippet of PHP code inspired by a real XSS vulnerability. The vulnerability exists because the attacker controls the $_POST variable at line 15, whose value can reach, without being properly sanitized, the echo statement at line 18. Despite the fact that the code is simple, certain SAST cannot detect this vulnerability.

```
1    <?php
2    function func1 ($vars){
3        $res = "";
4        foreach ($vars as $var => $val) {
5            $res = $ res.$var ;
6        }
7        return $res ;
8    }
9    function func2 ( ) {
10       $args = func_get_args( );
11       $ret = call_user_func_array('sprintf', $args);
12       return $ret;
13   }
14
15   $ vars = $_POST; //source
16   $x = func1($vars);
17   $y = func2 ($x);
18   echo $y; // sink
```

Figure 3:
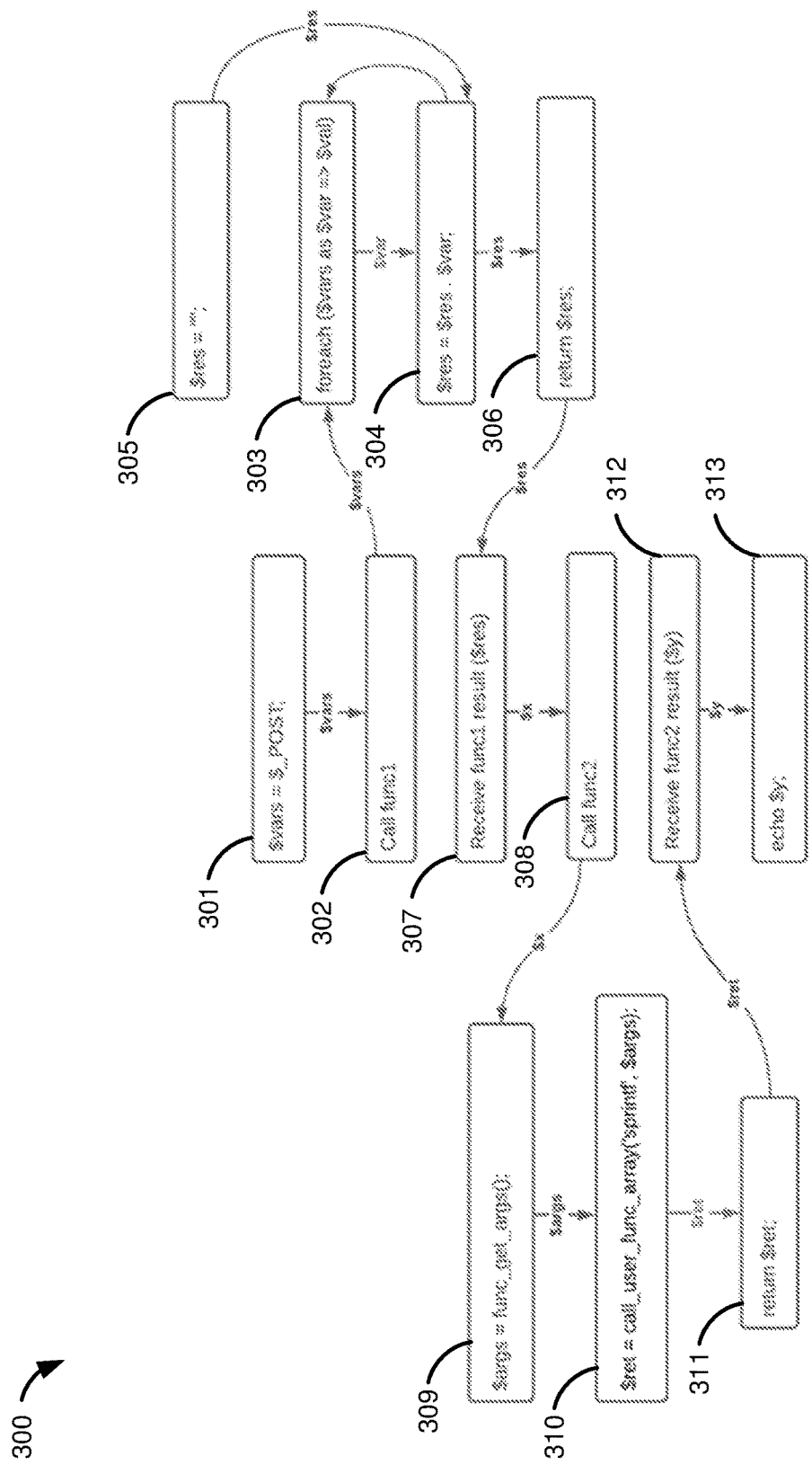
FIG. 3 shows a diagram of an exemplary dataflow through exemplary code, according to an embodiment.

The reason for the vulnerability is shown in FIG. 3 which shows a diagram of an exemplary dataflow through exemplary code, according to an embodiment. FIG. 3 gives a data flow graph of example code above. In the figure, there are three sets of blocks, associated respectively to the main function (in the middle) to func1 (on the right), and to func2

(on the left). Finally, the edges illustrate the data flow between the different lines of code.

In particular, func1 302 uses a foreach 303 loop to concatenate the keys of an array, an operation that is not handled correctly by a first SAST tool. As a result, the edge between 303 and 304 in FIG. 3 would be missing, thus breaking the path associated to the vulnerability. Moreover, func2 308 receives the arguments through the built-in function func_get_args 309 and then calls the built-in function sprintf 310 dynamically through the PHP function call_user_func, which this time poses problems to a second SAST tool. In this case, the edge between 309 and 310 would be missing, again resulting in a fragmented path that prevented the tool to detect the vulnerability.

This example shows two important aspects. First, the fact that the reason why SAST tools fail to discover vulnerabilities are different. Second, the fact that existing tools cannot be combined to overcome each other's limitations. Today, all an analyst can do is run both tools in isolation, in both cases reaching the same empty result.

While different tools use different strategies and are affected by different limitations, the combined model of the program is more complete, and therefore more effective at finding bugs, then their two models in isolation using the collaborative techniques described above.

Figure 4:
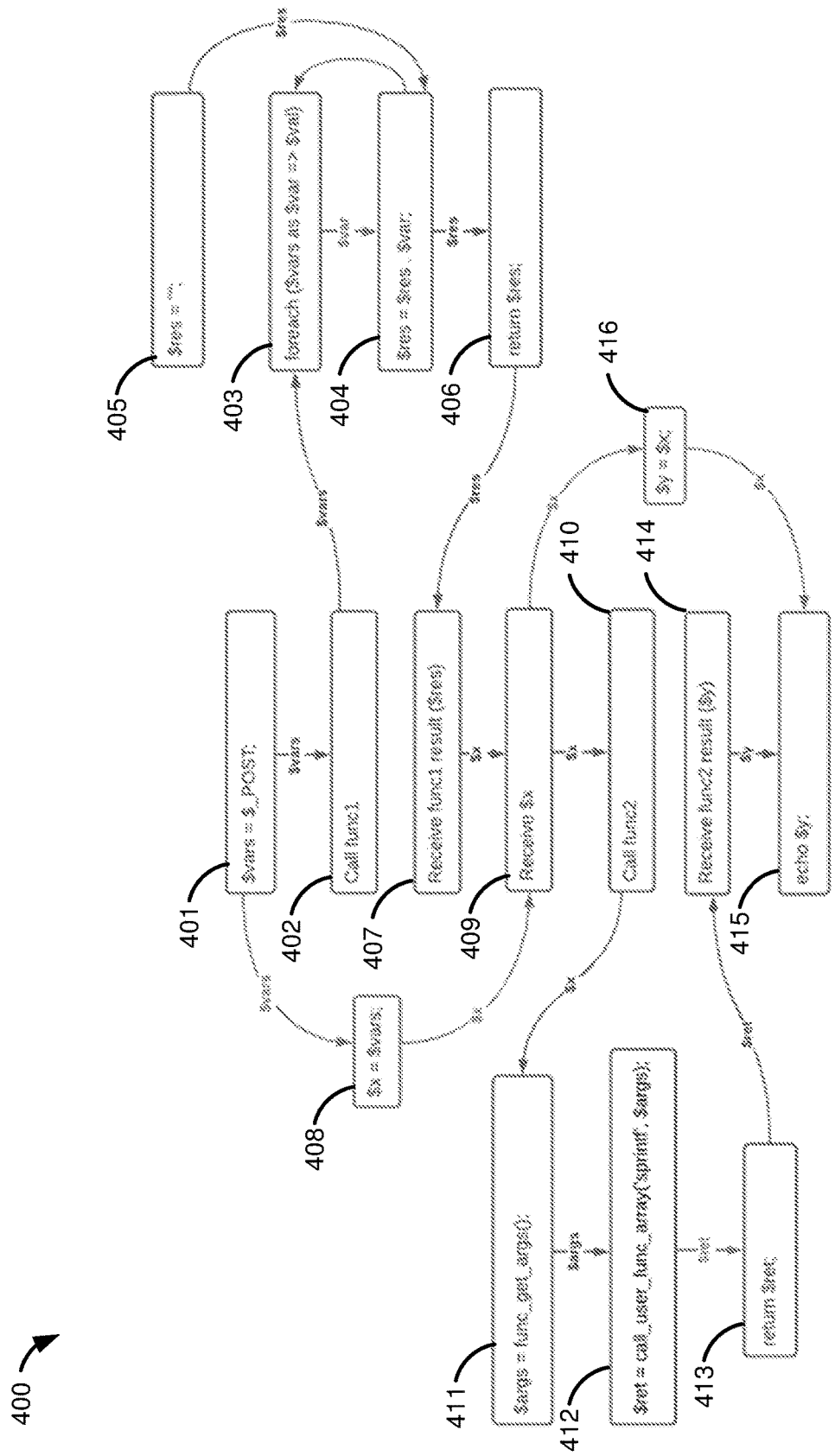
FIG. 4 shows a diagram of the exemplary dataflow of FIG. 3 with stitches added, according to an embodiment.

FIG. 4 shows the data-flow graph of the modified application after two iterations of our approach. The new edges to and from 408 and to and from 416 are the stitches introduced by the techniques described above. In the third iteration no new stitches are inferred and our approach moves to the evaluation phase.

To sum up, from this first iteration our approach learned that, through the function func1, tainted data propagates from the $vars variable to the $x variable. Our approach now uses this information to forcefully add this dependency in the program.

To make the relationship between the $vars and $x variables explicit, our approach modifies again the source code of the application, this time by adding a simple conditional assignment as in the code listing above where $vars and $x replace $in and $out, respectively.

The listing below shows the example snippet of PHP code modified to include fake sinks using echos:

```
<?php
function func1 ($vars){
    $res = "";
    foreach ($vars as $var => $val) {
        $res = $ res.$var ;
    }
    return $res;
}
function func2 ( ) {
    $args = func_get_args( );
    $ret = call_user_func_array ('sprintf', $args);
    return $ret;
}
$ vars = $_POST; //source
$x = func1($vars);
echo $vars; /*EI1-16*/
echo $x; /*EO1-16*/
$y = func2 ($x);
echo $x; /*EI1-17*/
echo $y; /*EO1-17*/
echo $y; // sink
```

The listing below shows the example snippet of PHP code with inferred stitches added to the code:

```
<?php
function func1 ($vars){
    $res = "";
    foreach ($vars as $var => $val) {
        $res = $ res.$var ;
    }
    return $res ;
}
function func2 ( ) {
    $args = func_get_args( );
    $ret = call_user_func_array ('sprintf', $args);
    return $ret;
}
$ vars = $_POST; //source
$x = func1($vars);
if(round(rand(0,1))){
    $x = $vars;
}
$y = func2 ($x);
if(round(rand(0,1))){
    $y = $x;
}
echo $y; // sink
```

In summary, with the stitch operation of our approach, we modify the application to add new instructions that explicitly connect two variables, when at least one tool detects that tainted data can flow from one to the other.

Example Hardware

Figure 5:
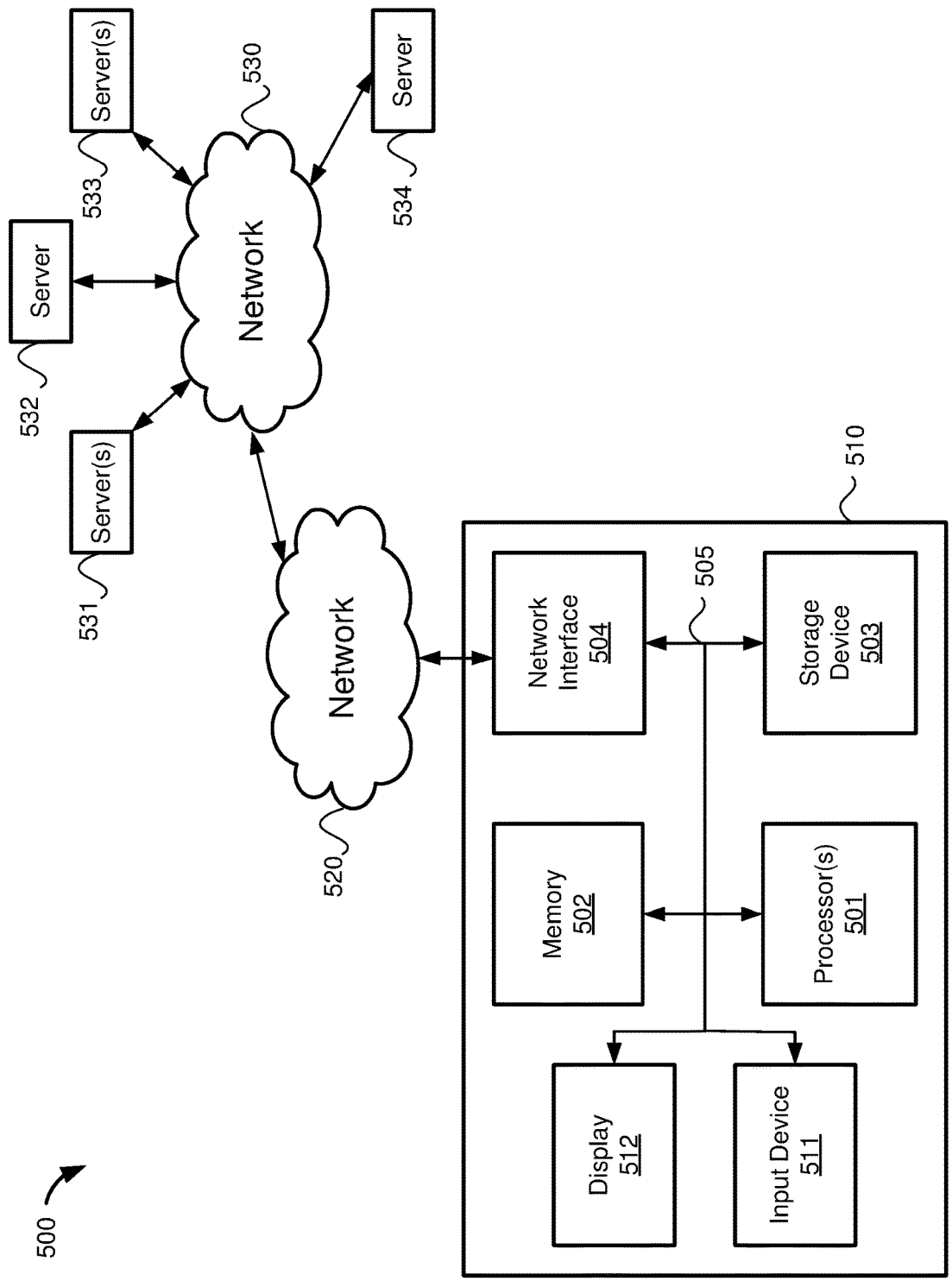
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (computer reprogram code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531-534. The servers 531-534 may be part of a cloud computing environment in some embodiments.

Experimental Results

An experiment was performed on 114 software projects including PHP code using the techniques discussed above. The experiment used two commercial SAST tools that support PHP language. Overall, the collaborative software application static vulnerability detection technique added 151.82 stiches per project, with a median of 35. Both SAST tools collected new alerts (e.g., software vulnerability notifications), with the first SAST tool collecting 93,022 alerts with the collaborative vulnerability detection techniques, up from 82,995 without using the collaborative vulnerability detection techniques disclosed herein. The second tool collected 80,090 alerts with the collaborative vulnerability detection techniques disclosed herein, up from 74,307 alerts without the collaborative vulnerability detection techniques.

The use of these techniques allowed the two SAST tools 8,394 new alerts were reported. Validation was performed on a random sample of 688 alerts, and when one alert was valid for a project the other alerts were checked for the same project, resulting in validation of 1,663 alerts. From this validation, 23 zero day vulnerabilities were reported and confirmed in eight different projects. Nine other potential vulnerabilities were also reported but confirmed has not yet been received from their developers.

By use of the collaborative software application static vulnerability detection techniques, software vulnerabilities were detected that could not have otherwise been detected by either of the SAST tools separately.

What is claimed is:

1. A computer system, comprising:
   one or more processors;
   one or more machine-readable medium coupled to the one or more processors and storing computer program code comprising sets instructions executable by the one or more processors to:
   obtain source code for a software application, the source code including a plurality of functions having one or more inputs and one or more outputs;
   inject print statements into the source code for each of the one or more inputs and the one or more outputs to obtain injection-modified source code;
   obtain two or more sets of first vulnerability findings from two or more respective static analysis tools run against the injection-modified source code, the static analysis tools including a first static analysis tool and a second static analysis tool;
   determine that the first static analysis tool reports that tainted data can flow from an input of a function to a return value of the function based on a first set of the first vulnerability findings from the first static analysis tool;
   determine that the second static analysis tool reports that tainted data can flow into the input of the function and that tainted data cannot flow to the return value based on a second set of the first vulnerability findings from the second static analysis tool;
   modify the injection-modified source code to include an assignment of the input to the output to obtain stitch-modified source code; and
   obtain two or more sets of second vulnerability findings from the two or more respective static analysis tools run against the stitch-modified source code, the two or more sets of second vulnerability findings including new vulnerability findings not in the two or more sets of first vulnerability findings.

2. The computer system of claim 1, wherein the computer program code further comprises sets of instructions executable by the one or more processors to:
   obtain two or more sets of original vulnerability findings from the two or more respective static analysis tools run against the source code prior to modification; and
   compare the two or more sets of second vulnerability findings to the two or more sets of original vulnerability findings to identify a set of new findings.

3. The computer system of claim 1, wherein the assignment of the input to the output is conditional on a random value generator.

4. The computer system of claim 1, wherein the assignment of the input to the output is positioned in the injection-modified source code after the function.

5. The computer system of claim 1, wherein the computer program code further comprises sets of instructions executable by the one or more processors to:
   remove corresponding print statements when modifying the injection-modified source code to include an assignment of the input to the output.

6. The computer system of claim 1, wherein the computer program code further comprises sets of instructions executable by the one or more processors to:
   remove print statements correspond to an output when all print statements for corresponding inputs are removed.

7. The computer system of claim 1, wherein the source code is in a PHP Hypertext Preprocessor language and the print statements are echo operations.

8. A non-transitory computer-readable medium storing computer program code comprising sets of instructions to:
   obtain source code for a software application, the source code including a plurality of functions having one or more inputs and one or more outputs;
   inject print statements into the source code for each of the one or more inputs and the one or more outputs to obtain injection-modified source code;
   obtain two or more sets of first vulnerability findings from two or more respective static analysis tools run against the injection-modified source code, the static analysis tools including a first static analysis tool and a second static analysis tool;
   determine that the first static analysis tool reports that tainted data can flow from an input of a function to a return value of the function based on a first set of the first vulnerability findings from the first static analysis tool;
   determine that the second static analysis tool reports that tainted data can flow into the input of the function and that tainted data cannot flow to the return value based on a second set of the first vulnerability findings from the second static analysis tool;
   modify the injection-modified source code to include an assignment of the input to the output to obtain stitch-modified source code; and
   obtain two or more sets of second vulnerability findings from the two or more respective static analysis tools run against the stitch-modified source code, the two or more sets of second vulnerability findings including new vulnerability findings not in the two or more sets of first vulnerability findings.

9. The non-transitory computer-readable medium of claim 8, wherein the computer program code further comprises sets of instructions to:
obtain two or more sets of original vulnerability findings from the two or more respective static analysis tools run against the source code prior to modification; and
compare the two or more sets of second vulnerability findings to the two or more sets of original vulnerability findings to identify a set of new findings.

10. The non-transitory computer-readable medium of claim 8, wherein the assignment of the input to the output is conditional on a random value generator.

11. The non-transitory computer-readable medium of claim 8, wherein the assignment of the input to the output is positioned in the injection-modified source code after the function.

12. The non-transitory computer-readable medium of claim 8, wherein the computer program code further comprises sets of instructions to:
remove corresponding print statements when modifying the injection-modified source code to include an assignment of the input to the output.

13. The non-transitory computer-readable medium of claim 8, wherein the computer program code further comprises sets of instructions to:
remove print statements correspond to an output when all print statements for corresponding inputs are removed.

14. The non-transitory computer-readable medium of claim 8, wherein the source code is in a PHP Hypertext Preprocessor language and the print statements are echo operations.

15. A computer-implemented method, comprising:
obtaining source code for a software application, the source code including a plurality of functions having one or more inputs and one or more outputs;
injecting print statements into the source code for each of the one or more inputs and the one or more outputs to obtain injection-modified source code;
obtaining two or more sets of first vulnerability findings from two or more respective static analysis tools run against the injection-modified source code, the static analysis tools including a first static analysis tool and a second static analysis tool;
determining that the first static analysis tool reports that tainted data can flow from an input of a function to a return value of the function based on a first set of the first vulnerability findings from the first static analysis tool;
determining that the second static analysis tool reports that tainted data can flow into the input of the function and that tainted data cannot flow to the return value based on a second set of the first vulnerability findings from the second static analysis tool;
modifying the injection-modified source code to include an assignment of the input to the output to obtain stitch-modified source code; and
obtaining two or more sets of second vulnerability findings from the two or more respective static analysis tools run against the stitch-modified source code, the two or more sets of second vulnerability findings including new vulnerability findings not in the two or more sets of first vulnerability findings.

16. The computer-implemented method of claim 15, further comprising:
obtaining two or more sets of original vulnerability findings from the two or more respective static analysis tools run against the source code prior to modification; and
comparing the two or more sets of second vulnerability findings to the two or more sets of original vulnerability findings to identify a set of new findings.

17. The computer-implemented method of claim 15, wherein the assignment of the input to the output is conditional on a random value generator.

18. The computer-implemented method of claim 15, wherein the assignment of the input to the output is positioned in the injection-modified source code after the function.

19. The computer-implemented method of claim 15, further comprising:
removing corresponding print statements when modifying the injection-modified source code to include an assignment of the input to the output.

20. The computer-implemented method of claim 15, further comprising:
removing print statements correspond to an output when all print statements for corresponding inputs are removed.

* * * * *